(12) United States Patent
Ikeda

(10) Patent No.: US 7,290,130 B2
(45) Date of Patent: Oct. 30, 2007

(54) INFORMATION DISTRIBUTING SYSTEM AND METHOD THEREOF

(75) Inventor: Yoshinobu Ikeda, Machida (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 09/977,351

(22) Filed: Oct. 16, 2001

(65) Prior Publication Data
US 2002/0066044 A1    May 30, 2002

(30) Foreign Application Priority Data
Oct. 17, 2000    (JP)    ............................ 2000-316200

(51) Int. Cl.
*H04L 9/00*    (2006.01)
(52) U.S. Cl. .................................................. 713/153
(58) Field of Classification Search ................ 709/229, 709/203; 713/153, 156; 726/11–13, 3
See application file for complete search history.

(56) References Cited

U.S. PATENT DOCUMENTS

| | | | | |
|---|---|---|---|---|
| 5,586,260 A | * | 12/1996 | Hu .............................. | 713/201 |
| 5,913,025 A | * | 6/1999 | Higley et al. ................ | 713/201 |
| 5,924,116 A | * | 7/1999 | Aggarwal et al. ........... | 711/122 |
| 5,991,810 A | * | 11/1999 | Shapiro et al. .............. | 709/229 |
| 6,202,169 B1 | * | 3/2001 | Razzaghe-Asrafi et al. .... | 714/6 |
| 6,303,561 B1 | * | 10/2001 | Painter ........................ | 510/446 |
| 6,438,652 B1 | * | 8/2002 | Jordan et al. ................ | 711/120 |
| 6,578,113 B2 | * | 6/2003 | Krishnamurthy et al. ... | 711/141 |

FOREIGN PATENT DOCUMENTS

JP    11-266279    9/1999

\* cited by examiner

*Primary Examiner*—Gilberto Barron, Jr.
*Assistant Examiner*—Thomas Ho
(74) *Attorney, Agent, or Firm*—Mattingly, Stanger, Malur & Brundidge, PC (57) ABSTRACT

A first information processing device for holding information connected to a first network, and at least a second information processing device connected to a second network, and an access control system having an access control device for controlling access of the second information processing device with first information processing device. The second information processing device has a copy of the information and, among access requests to first information processing device from the second network, the access control device only allows access from the second information processing device.

11 Claims, 10 Drawing Sheets

PRIOR ART

FIG. 13

PRIOR ART

INFORMATION DISTRIBUTING SYSTEM AND METHOD THEREOF

BACKGROUND OF THE INVENTION

The present invention relates to an information processing system connected to the Internet. More specifically the present invention relates to a system and method for protecting information stored within a system from unauthorized tampering from inside or outside the system.

Figure 12:
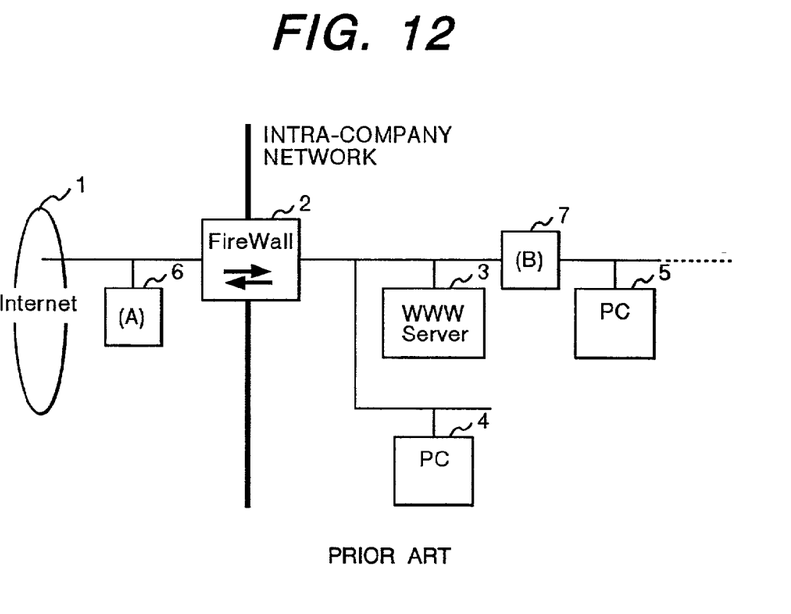
FIG. 12 is a block diagram of the system of the prior art.

In recent years, mutually connected computer equipment is being utilized for a variety of applications due to the spread of the Internet. Methods such as the following have been implemented as a means to prevent illegal access to these kinds of computers. The most typical protection means is illustrated in FIG. 12. A system called a firewall is connected between the information processing system and the Internet. Services provided over the Internet can be limited by using the firewall to reject unauthorized access.

Figure 13:
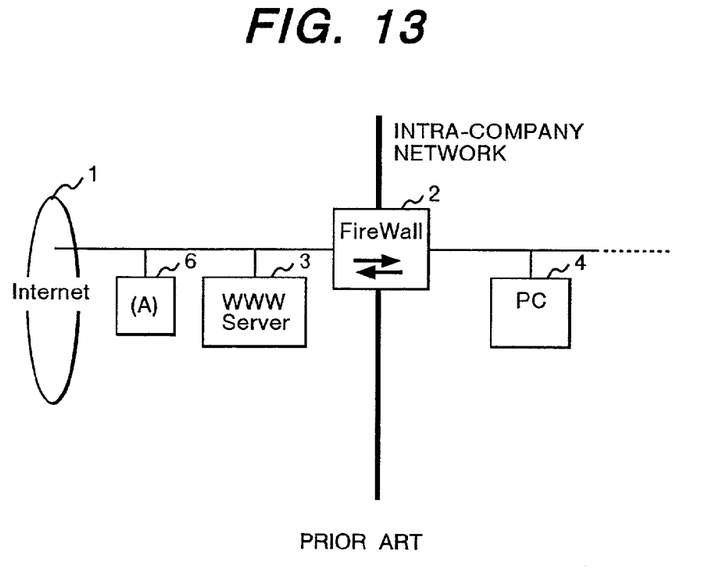
FIG. 13 is a block diagram showing another example of the prior art.

The computer equipment providing the service is installed outside the firewall as shown in FIG. 13, and in some cases protective measures are also installed on the computer equipment. Technology for installing a mail server external to the firewall in a system such as shown in FIG. 13 is disclosed in JP-A No. H11-266279. In a system of this kind, the user on the external side of the firewall can send or receive mail without using the firewall, and security within the firewall is enhanced.

SUMMARY OF THE INVENTION

The protective system of the prior art relied on a system called a firewall, generally requiring high installation and management costs. The strength of the protective system using a firewall depended on the ability of the firewall to withstand external attack. Also, various functions had to be added to the information processing system according to the various services provided over the Internet. These added functions made the internal configuration of the firewall more complex and created the problems of weaker performance and new holes in the security.

In a configuration with the service provider device installed externally to the firewall as shown in FIG. 13, due to the need for protection from external attack, the configuration did not allow easy access to the device providing the service from the inner side of the firewall. The typical firewall can withstand an external attack but no consideration was given to unauthorized tampering from within, so the firewall is not effective against internal attack. Further, when unauthorized tampering with information has occurred in an information processing system of the prior art, such tampering is not easy to detect, causing the problem of high costs for constant monitoring to discover illegal accessing.

The proxy server of the prior art has the objectives of proxy connection to the external Internet (attempting a connection with the WWW server requested by the user on behalf of the user computer running the WWW browser software, and if successfully connected, sending that acquired data from that WWW server to the user) as well as the objective of temporary storage (along with sending data acquired from the WWW server to the user, temporarily storing that data in its own memory space to prepare for a request for that data). The proxy server of the prior art was therefore not capable of protecting the (external) service provider device during inner side Internet connections. The mirror server of the prior art had the objectives of copying the contents of the target mirror server to lighten the load on the system and network, so no special consideration was given to protecting the system. The mirror server and the proxy server of the prior art were therefore no different from the protective system of the prior art in terms of security.

The present invention therefore has the objective of providing a system capable of lowering system operating costs and easily monitoring devices providing services over the Internet for unauthorized tampering. Other objectives of the invention will become apparent from the following description.

In the present invention, a plurality of replicas (copies) of the service provider system on the inner side of the firewall, are installed on the outer side of the firewall, and the user receives service provided only from these replicas. The service provider stores the information on the main service provider system on the inner side of the firewall. Since this system is on the inner side of the firewall, the information can be stored by various means without worrying about holes in the security.

The plurality of replicas serve to copy and rewrite the information of the main service provider system. Each replica periodically compares information contents with the information held by the other replicas to check if unauthorized tampering has occurred. When a discrepancy (difference) is detected among information held by the replicas, the main data from the service provider system on the inner side of the firewall is copied onto the replica, and a check made to determine if unauthorized tampering is present on the replica, and corrections can be made per the source information and a report made to the administrator.

A digital signature can be added to the information copied onto the replica. When using this function, the replica checks whether or not the digital signature for information transmitted to the user is valid, and when found to be valid sends the information, and when found to be invalid contacts the administrator (after the replica contacts the WWW server with the information that the signature is invalid, the WWW server contacts the administrator by mail or SNMP message, etc.). In the above configuration, persons without the right (access permission) to add the required digital signature can be rendered unable to open or change (tamper) with the information.

By interchanging the servers performing the services the plurality of replicas can appear as the same device as seen from the Internet. In the above configuration, devices can be separated into devices illegally connected internally and those that are legally connected and these devices can be mutually compared. The load on the replicas providing the service can also be dispersed, and a drop in speed can be prevented.

DETAILED DESCRIPTION OF THE PREFERRED EMBODIMENTS

Figure 1:
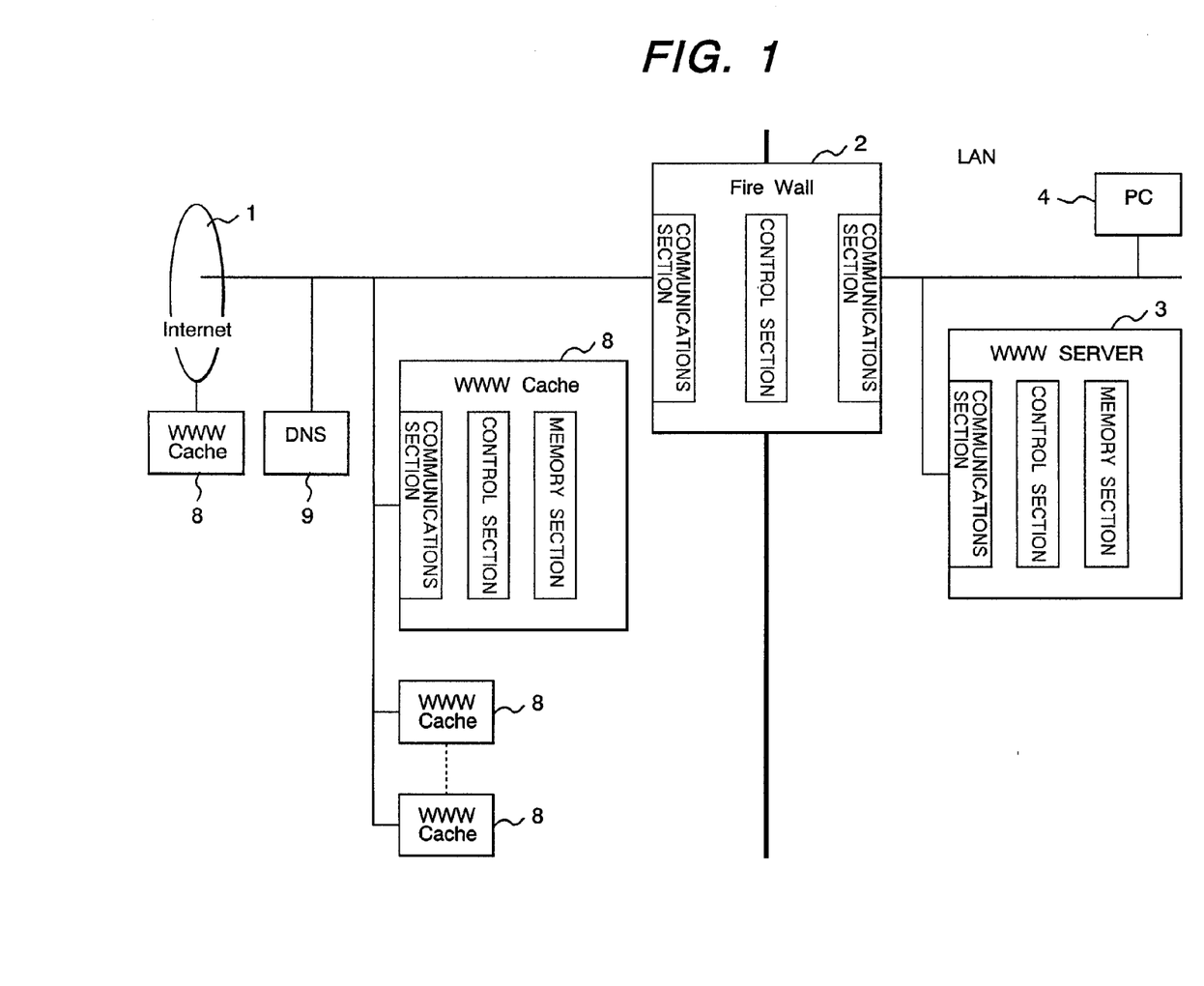
FIG. 1 is a concept system block diagram showing an embodiment of the present invention.

A block diagram of the embodiment of the system for providing a WWW service in the present invention is shown in FIG. 1. A local area network (LAN) is connected as the intra-company network to the Internet 1 by way of a firewall 2 in FIG. 1. A WWW service such as a WWW server 3 for providing web page(s) for example and a storage information system 4 utilized for creating information for storage in the WWW server are connected in the inter-company network. The firewall 2 is here comprised of a communications section for carrying out communications with the Internet side and replica 8 side, and a communications section for carrying out communications with the intra-company network side. The firewall 2 also has a control section to control access request to the intra-company network from the Internet side. Though not shown in the drawing, the firewall 2 has a memory section for storing programs involving processing by the control section.

The storage information maker system 4 on the intra-company network side runs on information processing equipment such as the PC. The operator stores information from the storage information maker system 4 into the memory of the WWW server 3. Besides communicating with the PC4 by way of the LAN, the WWW server 3 has a communications section for data transfer with the replica 8 by way of the firewall 2. Based on the signal received via the communications section, the control section processes information in the memory section, processing information stored in the memory section such as from the PC, and sending information in response to a transmit request from the firewall 2. Programs used by the control section to run this processing are stored in the memory section. Any generally used network transfer procedure can be utilized at this time because of protection by the firewall 2. The WWW server 3 can be selected for example as a file server, and file sharing performed between the WWW server 3 and the storage information system 4.

The replica 8 has a communications section for sending information and receiving information from the WWW server 3 via the firewall 2 and for sending and receiving information from the Internet. The replica 8 also contains a memory section for copying all the contents of the WWW server 3. The control section also performs storage in the memory section, CRC calculation and comparison processing. The processing by the control section is achieved by programs stored in the memory section. The copying of all contents of the WWW server 3 is a basic function however the copy quantity and the location for copying can also be set. In other words, when the contents on the server are comprised of a plurality of directories and files, from where to where the file and directories will be copied can be specified. Limits can also be specified on the number and size of files targeted for copying. Control can be achieved for example, by placing limits on the number and overall size of file for copying onto each directory, and by limits such as on the size of files for copying. The item for copying can also be automatically selected and actively changed according to factors such as capacity and frequency of access, etc.

A plurality of replicas 8 constituting caches of the WWW server 3 are connected to the outer side of the firewall 2. In FIG. 1, there are only four replicas 8 units and one WWW server 3 unit as seen from the Internet 1. However, more units than shown here maybe connected during actual use. Conversely, the number of replicas 8 units may be more than one. Further, one device may be connected to a plurality of units. The replicas 8 may further be connected in multiple stages. These replicas 8 may also be in other locations on the Internet, and the disposition structure of replicas 8 may be utilized to disperse the load on the network. A domain name server 9 is connected to the Internet, and this domain name server 9 changes the domain name to an IP address.

Figure 2:
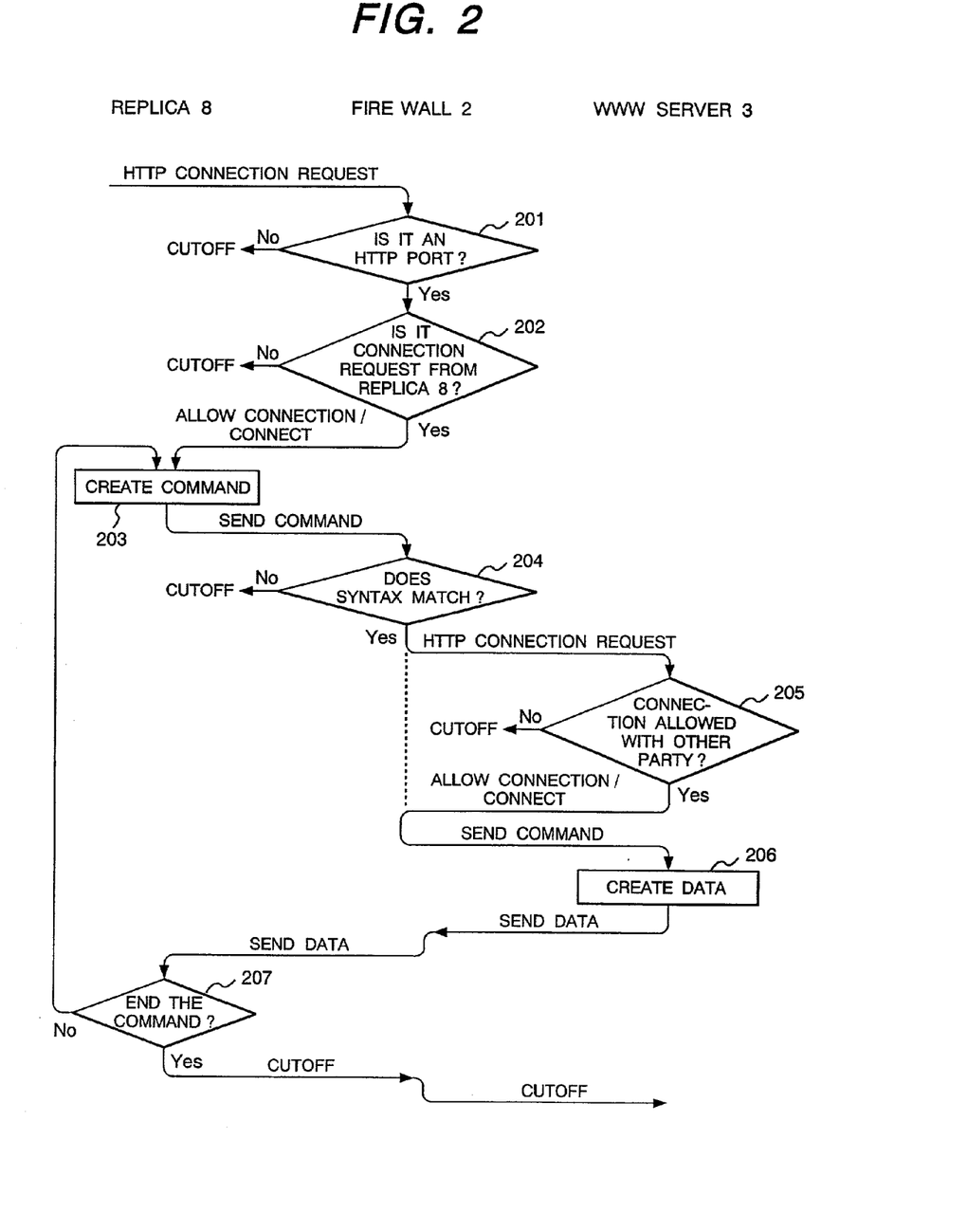
FIG. 2 is flow chart showing the operation in the firewall.

The connection processing between the replica 8, firewall 2 and the WWW server 3 is next described while referring to FIG. 2. The replica 8 carries out communications with the WWW server 3 via the firewall 2, regardless of the connection processing. In this case, the firewall 2 only opens the HTTP port to an external network. If a communication from an external network is through a port other than an HTTP port, (step 201 No.) then the firewall 2 cuts off this communication. If the communication from an external network is for an HTTP port (step 201 Yes) then the firewall identifies the transmission source from the information within the packet header, and determines whether or not it is a connection request from replica 8 (step 202). The connection is permitted if the packet transmission source is the replica 8 located in an external network but is cut off the transmission if the transmission source is another device. If the device for the connection request from an HTTP (port) is the replica 8, then the firewall 2 permits a connection to the replica 8.

The replica 8 having received a reply from the firewall 2 permitting connection, creates the command (step 203) and sends the request for processing to the WWW server 3. At the firewall 2 located between the WWW server 3, the command from the replica 8 is received and a syntax check of the command made (step 204). If an error is determined to be present in the syntax, then the communication is cut off. If the results of the check show that the syntax is correct, then the firewall 2 makes a connection request per the HTTP to the WWW server 3. The WWW server 3 identifies the transmission source of the connection request (step 205) and if the source is the permitted device, then a response is returned permitting correction, but if not then the permitted device then the transmission is cutoff. The firewall 2 having received permission for connection, sends the commands transmitted from the replica 8, to the WWW server 3. The WWW server 3 that received the command from the firewall 2, creates data according to the processing requested by the command (1006). Upon receiving this data, the firewall 2 sends this data to the replica 8 and, accepts further new commands per the replica 8. When the replica 8 then makes a processing request to the WWW server 3, the processing performed after creating the commands per replica 8 is repeated (1007 No.). If there are no requests to the WWW server 3, then the replica 8 sends a request to the firewall 2 to cutoff the communication. The firewall 2 makes the same request to WWW server 3 to cut off the communication, so that the communication between the replica 8, the firewall 2 and the WWW server 3 is then cutoff and the processing ends.

As described above, the firewall accepts only connection requests from the replica that utilized the HTTP so that restrictions can be placed on access even if not using an expensive, commercial firewall system. An HTTP proxy server for example can be built inexpensively by utilizing free software and can also be utilized as the firewall. Alternatively, the firewall and WWW server previously installed by the customer can be utilized as is. In this case, the customer installs a new replica 8, makes additional settings on the WWW server (adding of replica copy, rewrite functions) to form the WWW server 3. In this configuration, the replica 8 forms the copy (or duplicate) of the WWW server 3. In either case, a replica 8 utilizing only a general HTTP connection becomes the duplicate (or copy) of the WWW server 3, and the contents of the WWW server 3 cannot be rewritten from the replica 8. Unauthorized access to the WWW server 3 can in this way be restricted by the replica 8 and a firewall with a simple structure. The protection can be even further enhanced by a configuration described later on, when a system has two or more of the replica 8. In this embodiment, the WWW server was used as an example so that access was restricted to the HTTP port, needless to say however, restrictions can be implemented by the protocol matching each respective server. Furthermore, a protocol such as HTTPS capable of implementing the same write-restrictions as HTTP may be used rather than the HTTP port.

Figure 3:
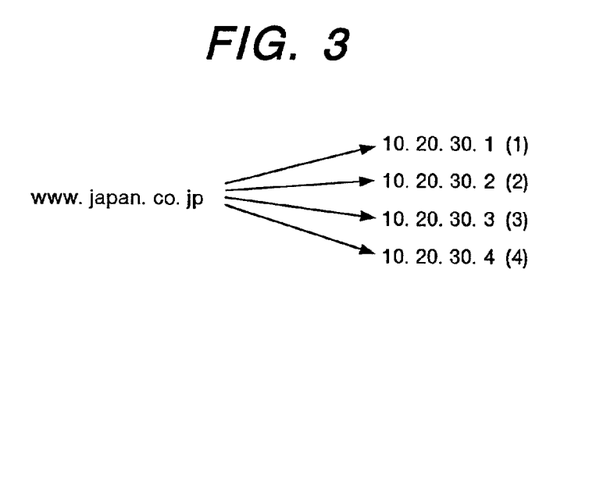
FIG. 3 is a drawing showing atypical structure of a domain name.

The configuration for connecting with the user terminal by way of the replica 8 and the Internet 1 is described next. The replica 8 only allows communication and connection by way of a specified port with the user terminal not shown in the drawing on the Internet 1. No ports are used at this time other than the port having this connection and the user terminal is set so it cannot make a connection. In other words, connections with the Internet are controlled by utilizing the domain name server 9. The domain name server 9 can change the stored entry at any time, and disperse access so as not to be concentrated in the same replica. The dispersion method is shown in FIG. 3. In FIG. 3, the user terminal, makes a connection request to the WWW server having the domain name of www.japan.co.jp. The domain name server 9 sends back randomly or by the round robin method, one of the IP addresses (1) through (4) assigned to the replica constituting the copy of this WWW server. The user terminal makes a connection with the IP address returned by this domain name server, so that user access is dispersed among the four replicas shown in FIG. 3.

Figure 4:
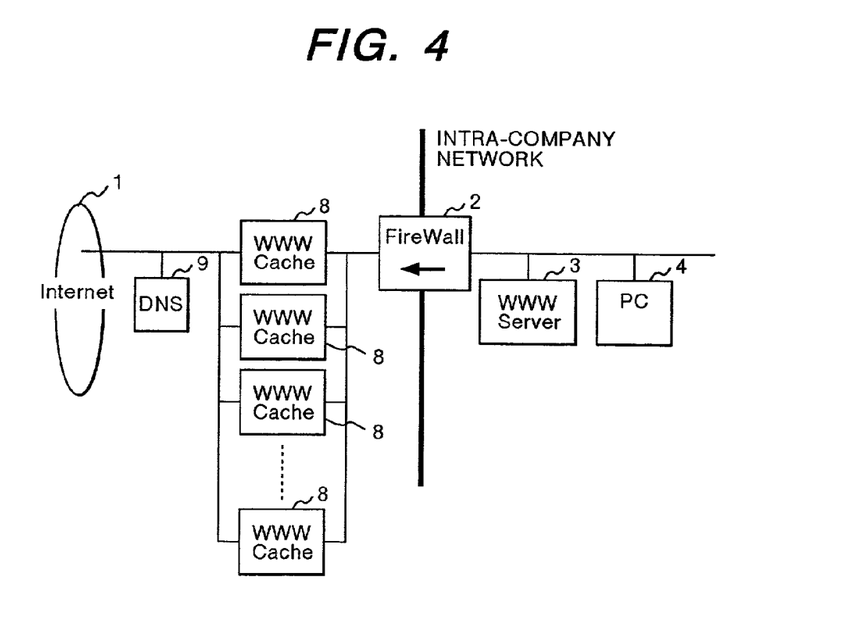
FIG. 4 is a system block diagram with a hidden firewall and improved protection compared to FIG. 1.
Figure 5:
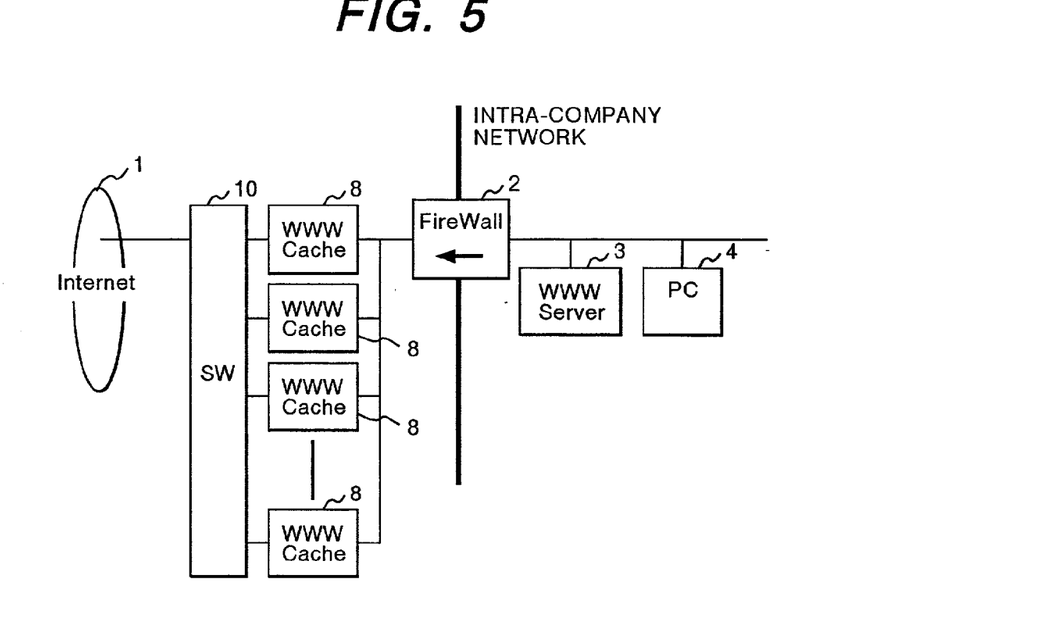
FIG. 5 is a system block diagram utilizing a switch and having improved protection and an improved load dispersing function compared to FIG. 4.

FIG. 1 showed a configuration where the replica 8 was directly connected to the Internet 1, however as shown in FIG. 4, a network different from the Internet 1 may be contrived and a connection made to the replica 8 on this network. As shown in FIG. 5, the communication path can be switched to the replica 8 by using a switch 10. The replica 8 and the firewall 2 can be connected via a network separate from the Internet 1, and by this network dispersion to the firewall 2 from the Internet 1, the system protection can be increased even further. When configured in this way, the domain name server 9 and the switch 10 can function as a load dispersing device.

Figure 6:
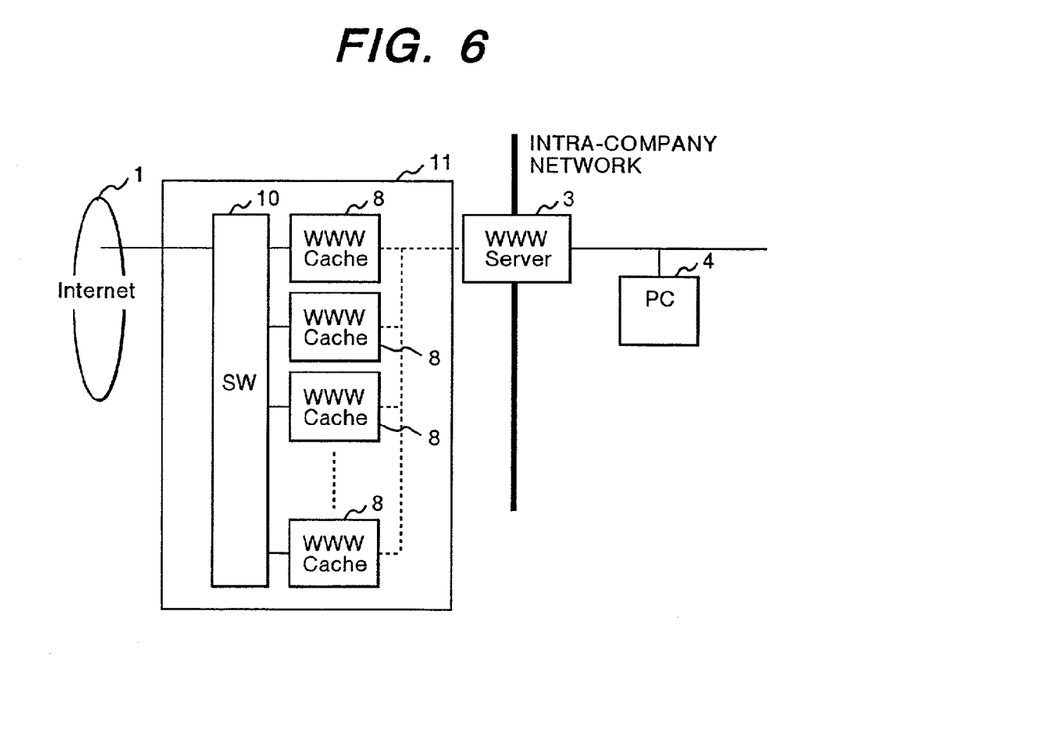
FIG. 6 is a block diagram showing when mounted with the equipment of the system in FIG. 5.

The replicas 8 and the switch 10 can comprise a device consisting of a WWW security device 11 as shown in FIG. 6. In this configuration, the WWW security device 11 can be directly connected to the WWW server 3 by utilizing a typical means exterior to the network such as a dedicated cable, and the firewall 2 eliminated while still maintaining protection. In other words, even without the firewall 2, the WWW security device 11 can provide protective functions such as preventing unauthorized access from the Internet. The WWW security device 11 uses the switch 1 to disperse connection requests from the Internet 1 and distributes them to a plurality of replicas 8. A plurality of these replica 8 units may be formed in a logical structure, to allot connection requests using the domain name server 9 such as described in FIG. 1 and FIG. 3 without using the switch 10.

Figure 7A:
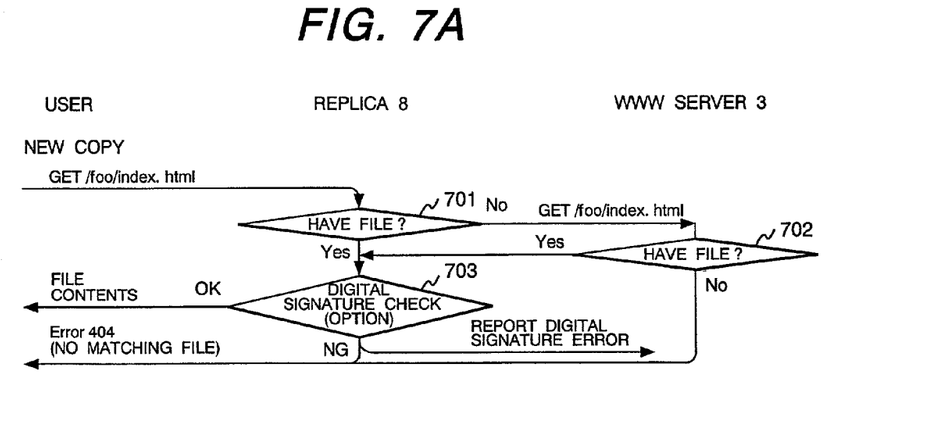
FIGS. 7A and 7B are drawings showing the instant rewrite function.
}

The communication flow with the replica 8 and the user terminal on the Internet 1 is next described while referring to FIG. 7. A drawing showing the distribution of information by the replica 8 as requested by the user terminal is shown in FIG. 7A.

The user terminal utilizes the GET command to request the /foo/index. html file from the replica 8, however the WWW server 3 is not accessed when the replica 8 holds a copy of this file (step 701, have file). When an digital signature described later on has been added to the file the replica 8 possesses, then a check is made of that digital signature (step 703). If the digital signature is correct (step 703), then the /foo/index. html file is sent to the user. If the digital signature is incorrect (step 703 NG) then an error is reported to the WWW server 3, an error report is issued to the user stating that such a file does not exist. The check of the digital signature is optional, and if the digital signature is not used then this processing is not performed and the file is sent to the user terminal.

When the replica 8 does not possess the /foo/index. html file (step 701, no file), after establishing a connection between the replica 8 and WWW server 3 through the processing shown in FIG. 2, then a command is sent to the WWW server 3 requesting the sending of the /foo/index. html file (now copy). When the WWW server 3 possesses a copy of the file (step 702, have file), the WWW server 3 sends that file to the replica 8, and the replica 8 makes a check if an digital signature has been added to the file that was sent, and sends that file to the user. When the WWW server 3 does not possess the file (step 702, no file) then an error is reported to the replica 8 as well as the user terminal from the WWW server 3.

In the above processing, the replica 8 receives a connection request on a specified port from a user terminal on the Internet 1, and sends a copy of the WWW server 3 information to the user terminal. When the page with the user request for the new copy of the file on WWW server 3 is not present on the replica 8, then that information is acquired from the WWW server 3. However, the processing (rewrite) to show the latest information held by the WWW server 3, in the information held in the replica 8, can be performed by means of results a comparison check of the replica 8 and the WWW server 3.

Figure 7B:
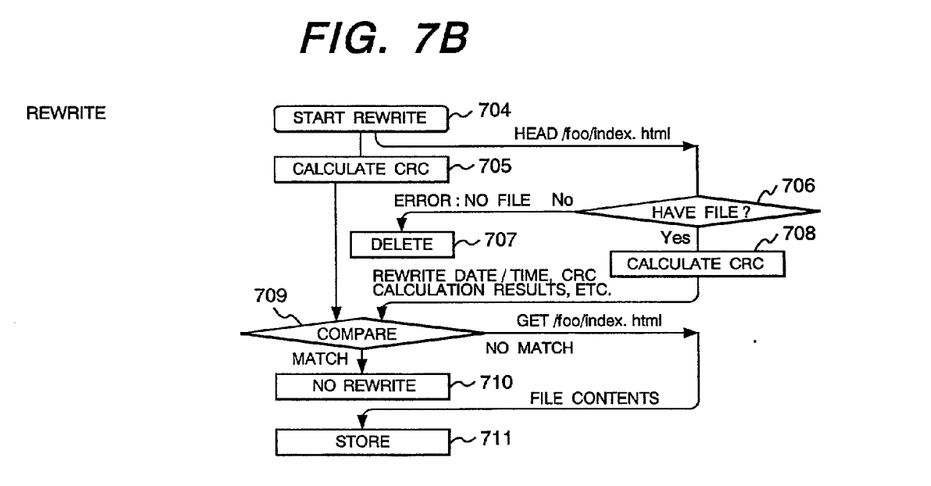

The processing for carrying out the compare check beforehand and rewriting is shown in FIG. 7B. The replica 8 first of all, makes a connection to the WWW server 3 or the cascade-connected host replica 8 (step S704). A CRC (cyclic redundancy check) error check code computation is then made of the applicable information (step 705). The WWW server 3 determines whether or not the requested file is present or not (step 702), and if not present (step 702, no file) sends error information to the replica 8. The replica 8 receives this and deletes the applicable file (907). If the applicable file is present (step 706, have file), then the CRC (cyclic redundancy check) error check code is calculated in the same way, and written (step 708). A rewrite date is added to this and sent to the replica 8. The CRC found by calculation and the CRC sent from the WWW server are then compared in the replica 8, to check if they match (step 709). If they match it indicates there was no rewriting of information and the replica 8 information is not rewritten (step 710). If they do not match, then the replica 8 makes a file transfer request to the WWW server and this file is saved (step 711). During this processing, communication with the user over the Internet is cutoff, and only implemented between the replica 8 and the WWW server 3.

Figure 7C:
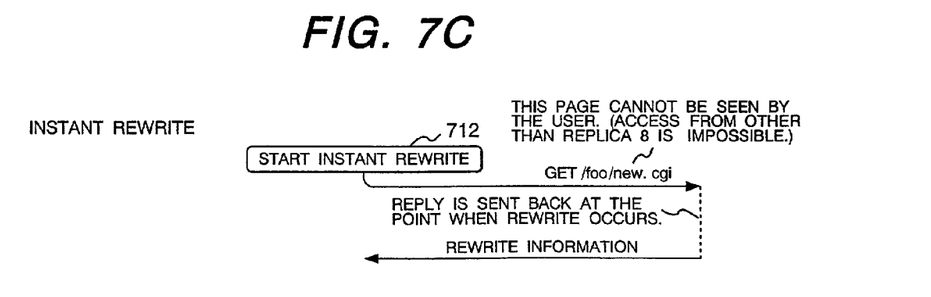

The process for instant rewrite is shown in FIG. 7C. Instant rewrite is the rewriting (or updating) of a file on replica 8 immediately after the matching file on the WWW server 3 was rewritten. In instant rewrite, the replica 8 issues a request for rewritten information with the GET command (step 712). The WWW server 8 retains this request until rewritten information occurs, and then returns a reply with the rewritten information at the time the rewrite occurs. The rewriting of the replica 8 can in this way be performed immediately after the rewriting of the WWW server 3.

The configuration for preventing file tampering through unauthorized access to the replica 8 is described next. Comparison checks are made at periodic intervals as explained next between the WWW server 3 on the internal intra-company network and the mutual replicas 8, as protective measures to prevent unauthorized access or tampering from user terminals on the Internet 1 with the plurality of replicas 8 installed on an external network. These comparison checks detect unauthorized tampering, and maintain the credibility of information held and transmitted by the replica 8.

Figure 8:
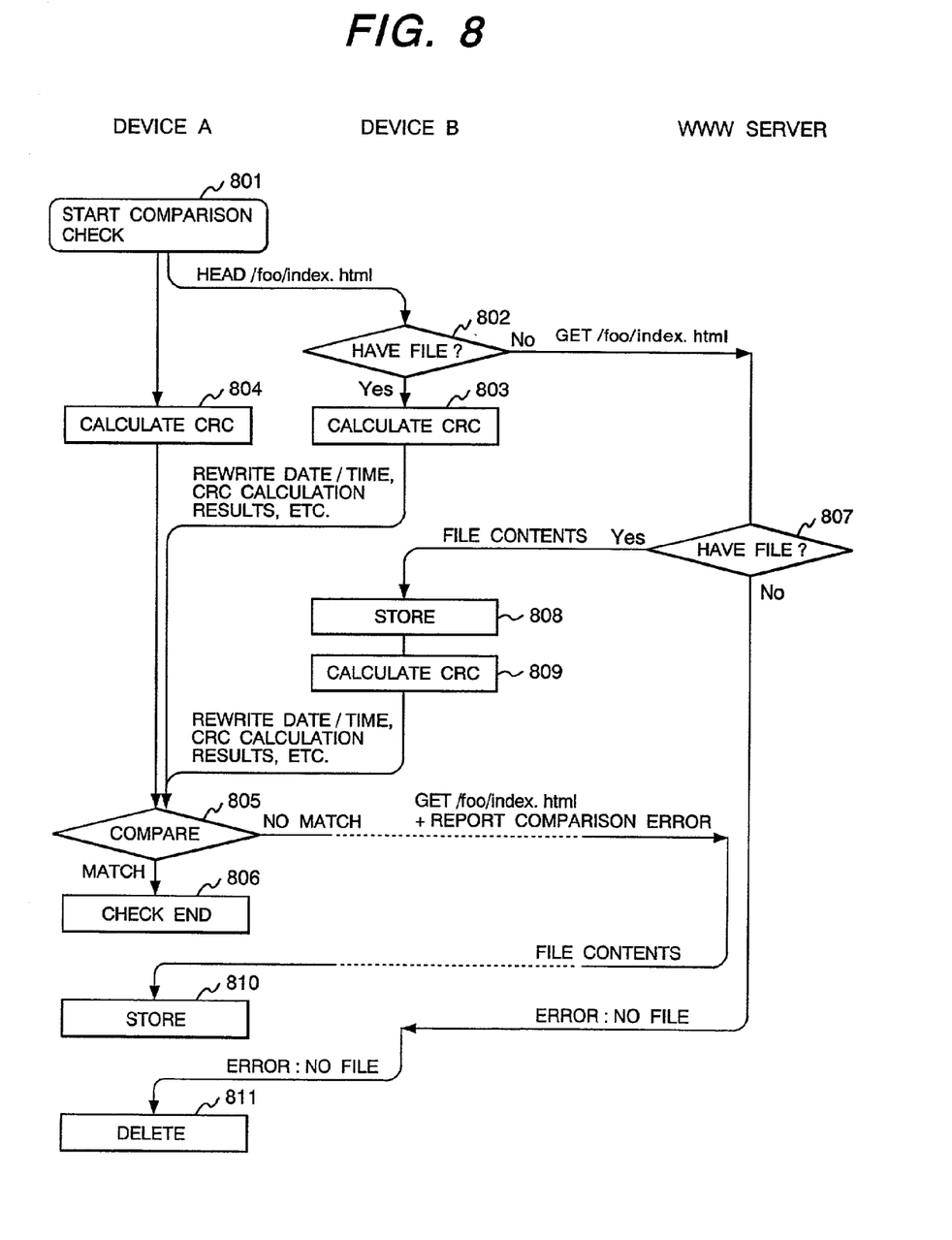
FIG. 8 is a drawing showing the comparison check.

The comparison check processing performed between the replica 8 is next described while referring to FIG. 8, for a configuration having two or more replica 8. The comparison check processing of the /foo/index. html file held by one replica 8 unit (device A) is shown in FIG. 8. First of all, the comparison check starts by the device A using the HTTP protocol "HEAD /foo/index.html" command to make a request to the device B for sending attribute information for the /foo/index. html file held by device B (step 801). When the device B receives the request from the device A to transmit attribute information for the /foo/index. html file, a check is made for that matching file (step 802). When the file whose transmit was requested is present, a CRC calculation of that matching file is made (step 803), and the calculated CRC is sent to device A along with a rewritten date. The device A on the other hand, also makes a CRC calculation of the matching file (step 804), and whether or not the CRC sent from device B and the CRC calculated by device A are a match is determined (step 805). If they match each other, then the check is terminated since there was no illegal tampering (step 806). If they are not a match, then the device A file is determined to be incorrect due to a reason such as tampering, and the file acquired from the WWW server 3 is stored in the device A (step 810).

When the file that received the HEAD command from device A is not held in device B (step 802, no file), then the device B makes a connection to the WWW server 3 with the GET command and a file transmit request is made before the device B returns the HEAD command reply to the device A. If the matching file is present in the WWW server 3 (step 807 have file), then that matching file is acquired and stored (step 808), and the CRC calculated in the same way (step 809). The calculated CRC is compared with the CRC of device A, and if the CRC match each other then the check is terminated (step 806). If they do not match, then the file of device A is determined to be incorrect due to reasons such as unauthorized tampering, and the file acquired from the WWW server 3 is stored in the device A (step 810).

When the WWW server 3 does not have the file whose transmit was requested, the device B decides that the file was deleted from the WWW server 3, or was a file added to the device A over the Internet by an intruder on the network. As a reply to the HEAD command in device A, the device B sends back a delete command for the matching file and informs the WWW server 3 that a delete command has been issued in a HEAD command added with a new attribute. Alternatively, rather than deleting the file, it can be temporarily stored in a separate memory area, and stored in a designated memory region of the WWW server 3 with the POST command. In that case, the evidence of unauthorized access is left intact. These responses can all utilize encryption, and can also safely send deletion information to remote replicas on a network. Comparison checks were implemented as described above, however when implemented by custom procedures between the replica 8 and the WWW server 3, the check is not limited to the HEAD, GET, POST command specifications, and there is a greater degree of freedom in the design.

In this way, the same comparison check can be performed on other files as required by replica 8. The comparison check can be performed not only between the mutual replicas 8, but also between the replica 8 and the WWW server 3. This processing is not limited to configurations having one or more replicas 8, but can also be applied to cases where there is just one replica 8. When making a comparison check between the WWW server 3 and the other check target, the file might possibly have been rewritten in the WWW server 3 so a rewrite check of information is also simultaneously performed (FIG. 7B) to find if the information held in the replica 8 has the newest contents.

A configuration to add new attributes to the HEAD command (expand functions so as to also return a check code in addition to a function for returning the file data and size, etc.) and obtain a file check code (check-sums and CRC code, etc.) may also be used. The attribute information held by other devices or WWW servers and acquired with the HEAD command in this way can be compared using these check codes so that the data to be sent and received can be non-reversibly encrypted with hash marks, etc.

Figure 9:
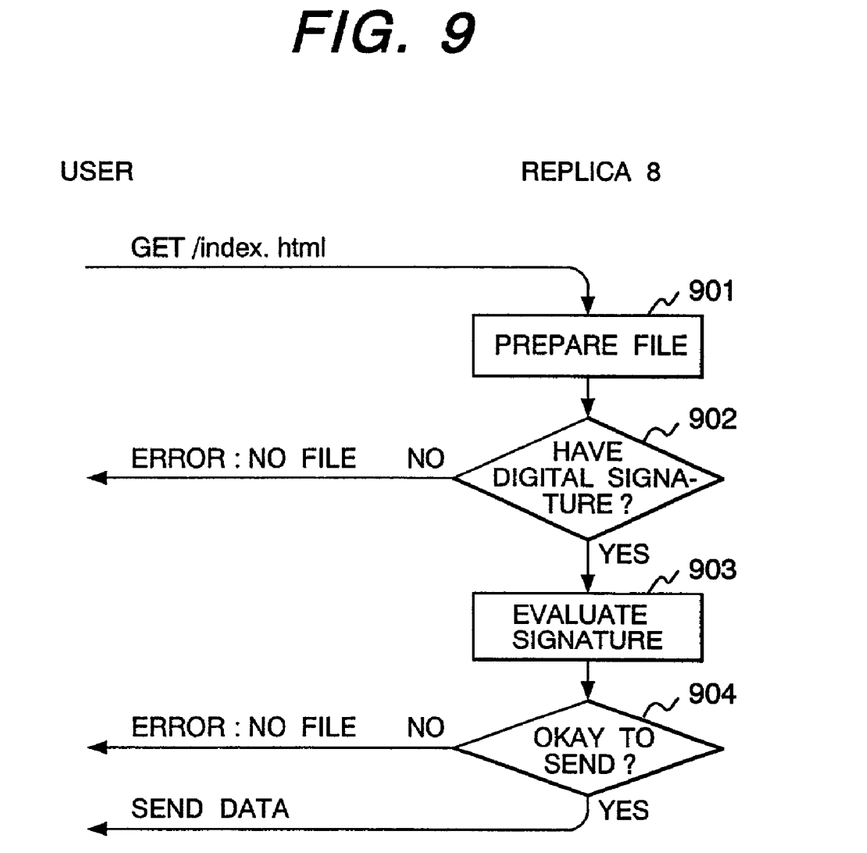
FIG. 9 is a flow chart showing the information transmit control utilized for the digital signature.

The previously mentioned digital signature is explained next. The information for storage in the WWW server 3, can be applied with a digital signature by means of signature generating procedures during storage of the data. The process flow when using the digital signature is shown in FIG. 9. The file requested with the GET command is prepared in the replica 8 (step 901). Next, a check is made for a digital signature (step 902), and if there is no digital signature, it is determined this file cannot be sent to the user, and an Error, No-file reply is sent to the user. When a digital signature is present, this signature is evaluated (step 903), and approved or rejected for distribution to the applicable user (step 904). Data is sent to user for whom sending was approved, or an Error, No-file reply is sent to the user when not approved.

Though not shown in the drawings, when the signature within the distribution information is not a genuine signature, the replica 8 recopies the information held by the WWW server 3, and that signature can also be checked. Further, when the recopied information is also not genuine, a message is sent to the user reporting an error. A configuration may also be used that reports false signatures to the administrator at any stage.

Figure 10:
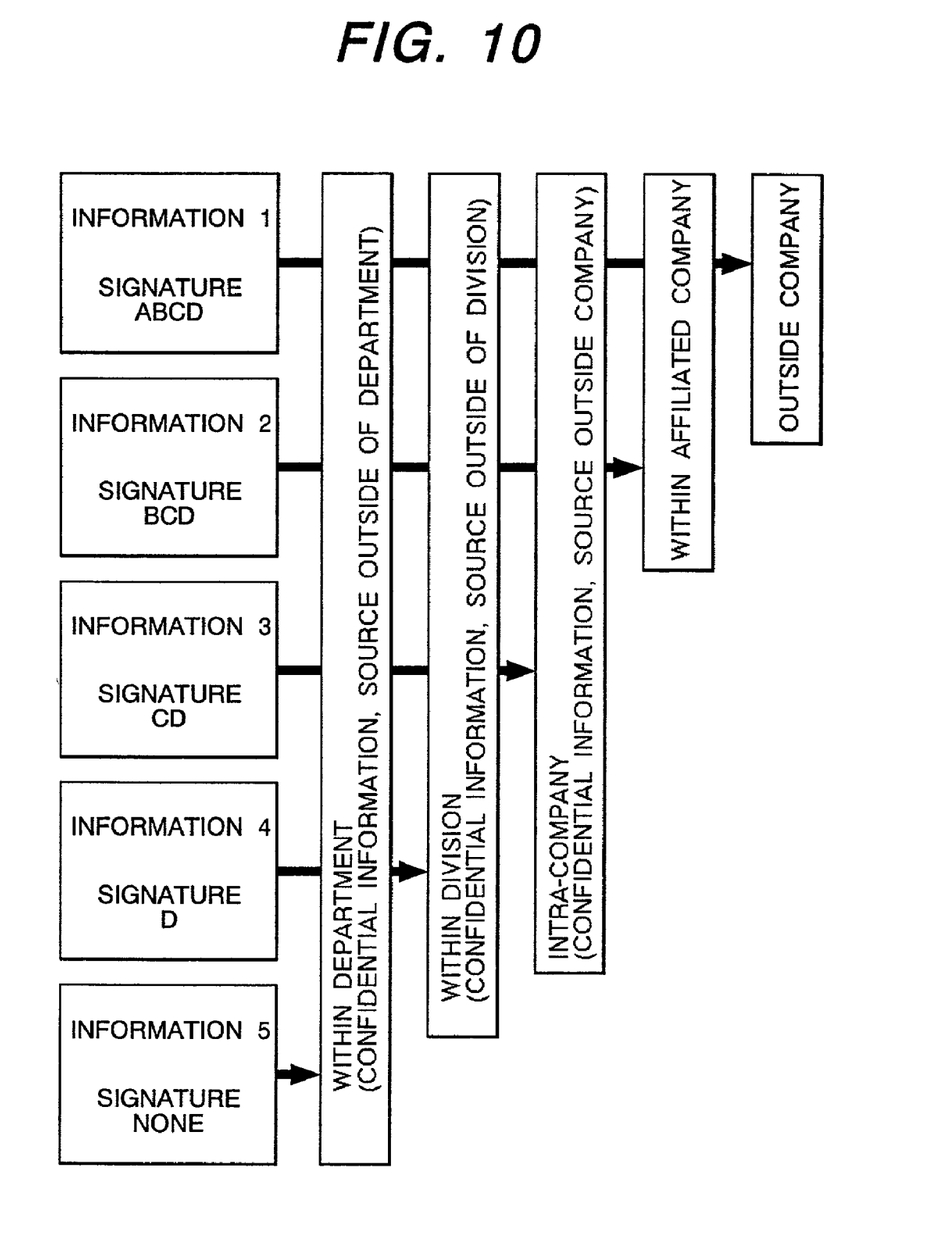
FIG. 10 is a drawing showing the transmit control for rating the digital signature.

The distribution information can be divided into groups as shown in FIG. 10 by utilizing the digital signatures in a configuration to control the distribution destination. As an example, the configuration in FIG. 10 shows four types of digital signatures A, B, C, D for the information. The information 1 here is added with all four types of digital signatures. This information 1 is identified by these four digital signatures as information distributed outside the company and within the company including affiliated companies. The information 2 is information added with the three types of digital signatures B, C, D. The information 2 is identified as a range of distribution information from inside the company (intra-company) and affiliated companies. The distribution range of the information from here onwards can be set according to the type of digital signature as information 3, information 4, and as information 5.

Figure 11A:
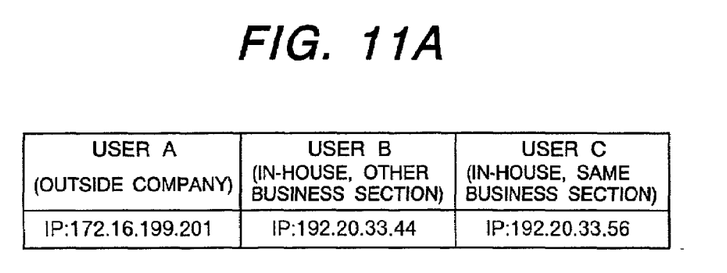
FIGS. 11A and 11B are flow charts showing the information transmit control utilized for a plurality of digital signatures.

The process for dividing the distribution information into groups is described next while referring to FIG. 11. In the example, this is division into groups consisting of User A outside the company, User B in another section inside the company, and User C in the same section within the company. FIG. 11A shows the IP addresses for users A, B and C.

Figure 11B:
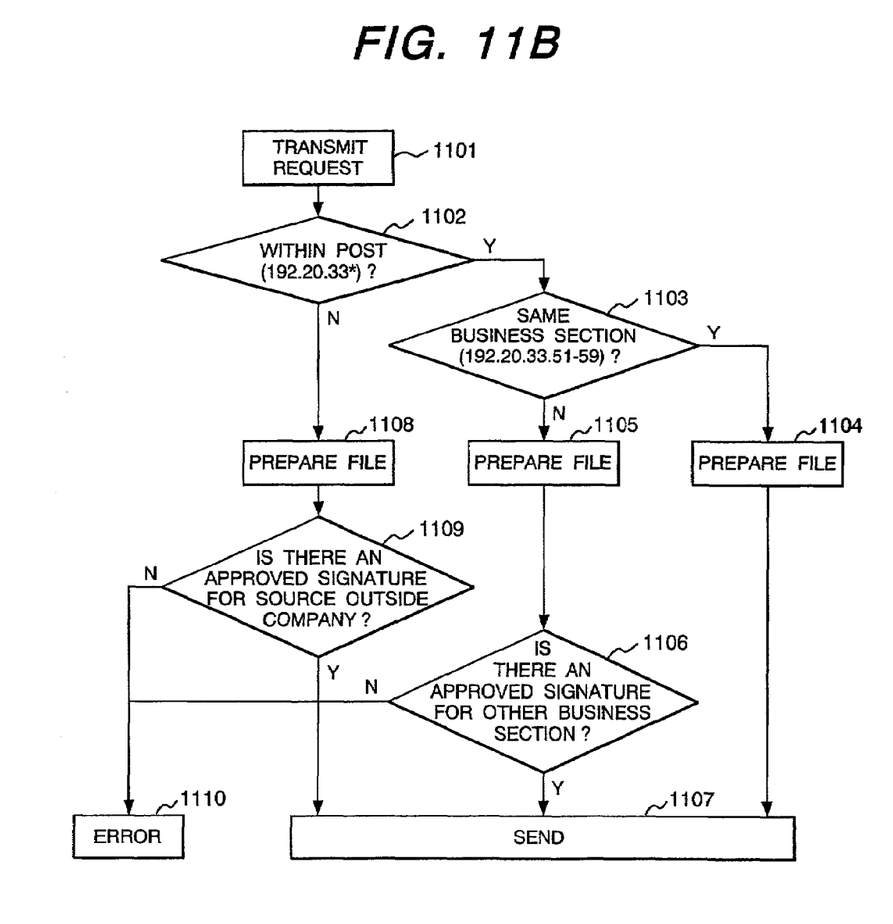

A detailed description of the processing is explained while referring to FIG. 11B. The replica 8 or WWW server 3 that received the data distribution request (step 1101) identifies whether the user's IP address is from within the company or outside the company (step 1102). When the user's IP address is within the company (intra-company), it is further identified to find whether or not it is the same section (step 1103). If the IP address is from the same section (user C) then the information is distributed without checking the digital signatures (step 1104). If the user IP address is from another section (user B), then along with preparing the file (step 1105), a check (step 1106) is made to determine if the digital signature added to the information for distribution is a type whose distribution to other sections is allowed. If allowed, then the information is distributed. When the user's IP address is outside the company (user A), then along with preparing the file (step 1108), a check is made to (step 1109) to determine if the digital signature added to the information for distribution is a type whose information distribution to outside the company is allowed. If allowed, then the information is distributed, and if other than the allowed type then an error is reported to the user and the information is not distributed.

The above methods for utilizing the digital signature, are effective when the WWW server 3 has been grouped per application such as for inside the company and for outside the company. In other words, the distribution destination can be found by the presence (or lack) of a digital signature and differences in the digital signature. Information without a digital signature for example, is not copied onto the replica 8 or even if copied, is not distributed, so that access is only possible from a location with direct access to the WWW server 3. By therefore grouping information for outside the company by using digital signatures, and information for inside the company without using digital signatures, the distribution information can be categorized into outside company/inside company groups. In rating by means of digital signatures, control can be achieved such as for (information) distribution only to specified customers, by information recorded along with the signature.

The replica 8 is essentially a device for making copies of information distributed by the WWW server 8, and once the copy source settings are made there is no need for operation by an operator provided no large changes occur. The copy source settings indicate the copy policy such as to what extent to copy what server, whether or not to use a check code, whether or not to use a digital signature or code number, and whether or not to perform instant rewrite. The information allowed to pass through the firewall 2 is an accumulation of attribute information for the transmit source, etc. The attribute information accumulated in the firewall 2 can be collected in the WWW server 3. Therefore, just as with the replica 8, there is no need for the operator to manipulate the firewall 2. Since a human operator is therefore not required in operation between the replica 8 and the firewall 2, the replica 8 and the firewall 2 can be installed in rooms physically separated from each other and locked by an actual physical key. In this way, a person within the system not having the actual key, can be prevented from unauthorized intrusion and access to the system, and from disclosing or tampering with information.

There is no need to connect the replica 8 and WWW server 3 by ordinary network procedures. Therefore, if the number of communications devices on the WWW server 3 side are increased and connection made by in-house (custom) communication procedures then a firewall 2 is not needed because no Internet protocol is used. This can help lower overall system costs and prevent unauthorized system intrusion or system breakdowns from occurring due to security defects in the firewall 2. The connection for these custom procedures, does not require a device 11 as shown in FIG. 6, and may also be implemented with a configuration as shown in FIG. 4 and FIG. 5. A firewall 2 may also be internally installed when the device 11 does not use custom procedures in communications between the replica 8 and the WWW server 3. The device 11 may also incorporate internal options of other network devices such as routers, and the device 11 may also be installed in the WWW server 3. When the system of the present invention is installed with devices such as described above, the advantage of a simpler more convenient system configuration and management is obtained.

The embodiment of the present invention was described as above, however, if multiple stages of the replica 8 are connected, and the latter stages of the replica 8 only connected to receive from the prestage, then the protective functions can be further enhanced. In that case, the replica 8 forming the pre-stage may be in another location on the Internet 1, and if installed at a location near a network with many users, then the overall network load can be lightened.

In the information transmission system of the present invention functioning on the Internet, information storage is simple, the load is reduced, and the detection of tampering and storage of unauthorized information is simple so that even if tampering occurs, the source information is easily corrected, therefore rendering the effect that great improvements can be made in the trouble and costs involved in system structure and management.

What is claimed is:

1. A second information processing device for providing a copy of original information to the user and for communicating with a first information processing device, which connects to a local area network by way of an access control device for controlling connections with said local area network and Internet, said second information processing device connecting to said Internet and comprising:

a memory section for storing in advance a second copy of original information held in said first information processing device, a communications unit to acquire a first check information relating to a first copy of original information from another second information processing device connecting to said Internet having said first copy of original information corresponding to said second copy of original information possessed by said memory section, a control unit to make a second check information relating to said second copy of original information possessed by said memory section, comparing said second check information with said acquired first check information, requesting the first information processing device to transmit the original information when the second check information and the first check information are not the same.

2. A second information processing device according to claim 1, wherein said communication unit requests said first information processing device to transmit the original information.

3. A second information processing device according to claim 1, wherein said first and said second check information are check codes.

4. A second information processing device according to claim 2, wherein said communications unit requests said original information by an HTTP protocol.

5. A second information processing device for communicating with a first information processing device, which connects to a local area network by way of an access control device for controlling connections with said local area network and Internet, said second information processing device connecting to said Internet and comprising:
   a memory section for storing a copy of original information held in said first information processing device;
   a communications unit for receiving a transmit request of check information relating to the copy of original information from another second information processing device connecting to said Internet, and acquiring the original information from said first information processing device when said copy of original information relating to transmit request of the check information is not in said memory section; and
   a control section to calculate check information of said acquired original information,
   wherein said communications unit sends said calculated check information to said another second information processing device.

6. A second information processing device according to claim 5, wherein said rewrite information is check codes.

7. A second information processing device according to claim 5, wherein said communications unit communicates with said first information processing device by an HTTP protocol.

8. An information distributing system comprising a plurality of second information processing devices for communicating with a first information processing devices connecting to a local area network by way of an access control device for controlling connections with said local area network and Internet, a plurality of said second information processing devices connecting to said Internet,
   each of a plurality of said second information processing devices comprising:
   a memory section for storing in advance a second copy of original information held in said first information processing device;
   a communications unit for acquiring a first check information relating to a first copy of original information from another second information processing device connecting to said Internet having said first copy of original information corresponding to said second copy of original information possessed by said memory section; and
   a control unit for making a second check information relating to said second copy of original information possessed by said memory section, comparing said second check information with said acquired first check information, requesting the first information processing device to transmit the original information when the second check information and the first check information are not the same.

9. An information distributing system according to claim 8, wherein said communications unit makes a transmission request to said first information processing device to send said original information of said second copy possessed by said memory section when said first rewrite information does not match to said second rewrite information.

10. An information distributing system according to claim 8, wherein said first and second rewrite information are check codes.

11. An information distributing system according to claim 9, wherein said communications unit requests sending said original information by an HTTP protocol.

* * * * *